United States Patent
Christiansen et al.

(10) Patent No.: US 6,795,462 B1
(45) Date of Patent: Sep. 21, 2004

(54) GAS LASER

(75) Inventors: Jens Christiansen, An den Hornwiesen 4, D-91054 Buckenhof (DE); Kai Christiansen, Buckenhof (DE); Joachim Jacoby, Igensdorf (DE); Silke Christiansen, Buckenhof (DE)

(73) Assignee: Jens Christiansen, Buckenhof (DE)

( * ) Notice: Subject to any disclaimer, the term of this patent is extended or adjusted under 35 U.S.C. 154(b) by 0 days.

(21) Appl. No.: 10/019,638
(22) PCT Filed: Jul. 3, 2000
(86) PCT No.: PCT/EP00/06195
    § 371 (c)(1),
    (2), (4) Date: Apr. 12, 2002
(87) PCT Pub. No.: WO01/03256
    PCT Pub. Date: Jan. 11, 2001

(30) Foreign Application Priority Data
    Jul. 2, 1999 (DE) .......................... 199 30 755

(51) Int. Cl.⁷ .............................. H01S 3/00; H01S 3/22
(52) U.S. Cl. ............................................ 372/37; 372/55
(58) Field of Search ............................. 372/37, 55–65

(56) References Cited

U.S. PATENT DOCUMENTS

| | | | | |
|---|---|---|---|---|
| 3,681,710 A | * | 8/1972 | Lary et al. ........... | 372/37 |
| 4,035,741 A | * | 7/1977 | Crisp et al. ........... | 372/37 |
| 4,449,219 A | * | 5/1984 | Smith et al. ........... | 372/2 |
| 4,461,004 A | * | 7/1984 | Madey ................. | 372/2 |
| 4,599,724 A | * | 7/1986 | McMullin ............. | 372/2 |
| 4,604,752 A | * | 8/1986 | Sequin et al. ......... | 372/29.02 |
| 4,949,353 A | * | 8/1990 | Jaenisch .............. | 372/59 |
| 4,974,228 A | * | 11/1990 | Petersen ............. | 372/37 |
| 5,115,439 A | * | 5/1992 | Howard .............. | 372/37 |
| 6,185,234 B1 | * | 2/2001 | Ozu .................. | 372/34 |
| 6,331,994 B1 | * | 12/2001 | Ohmi et al. ........... | 372/82 |
| 6,433,494 B1 | * | 8/2002 | Kulish et al. ........... | 315/500 |

FOREIGN PATENT DOCUMENTS

JP          5-182789        *   7/1993

* cited by examiner

*Primary Examiner*—Paul Ip
*Assistant Examiner*—Phillip Nguyen
(74) *Attorney, Agent, or Firm*—Levisohn, Berger & Langsam, LLP (57) ABSTRACT

The invention describes a gas laser comprising a container (6) intended to receive a gas or a gas mixture as laser-active medium, the container (6) having an axis (14) along which the gas laser emits its laser radiation, and comprising further means for generating a plasma in the container (6) and means for generating a magnetic field in the container (6). It is provided according to the invention that a group of at least two pairs of magnet poles is arranged, with the poles (1, 2) extending at a distance from, and along the axis (14) and being arranged around the axis (14) with alternating polarity so that the magnetic field emanating from them exhibits an intensity sink in the region of the axis (14), and that the means for generating the plasma include a source for an electromagnetic alternating field, which is associated to the container (6).

50 Claims, 7 Drawing Sheets

Fig. 1

Fig.2 Scan-Bild des laseraktiven Plasmas
   Diagonaldurchmesser 2,8mm
   Polschuhabstand 3cm
   Neon, 40MHz, 40W

Fig. 4a zum HF Generator 15

GAS LASER

TECHNICAL FIELD

The present invention relates to a gas laser comprising a container intended to receive a gas or a gas mixture as laser-active medium, the container having an axis along which the gas laser emits its laser radiation, and comprising further means for generating a plasma in the container and means for generating a magnetic field in the container. A gas laser of this kind is known from "Laser" by F. K. Kneubühl, M. W. Sigirst, published by B. G. Teubner Stuttgart, 1988, pp. 232 to 271.

More specifically, the invention concerns rare-gas lasers, for example helium-neon lasers, ion lasers, especially argon ion lasers, and molecular lasers, especially $CO_2$ lasers.

STATE OF THE ART

Excitation of the active medium in a gas laser usually is initiated by an electric discharge. Free electrons and ions are produced in an electric gas discharge. These charge carriers gain kinetic energy due to the acceleration in the electric field of the gas discharge. The kinetic energy of the electrons so gained can be transferred, by inelastic collision, to other gas particles and can excite the latter to higher levels. The movement of the ions is, generally, of no importance as only the free electrons contribute to the excitation of the gas atoms, gas ions or molecules. A stimulating emission of radiation can then take place from the higher levels.

A helium neon laser is a neutral atom gas laser in which a direct-current or high-frequency discharge is excited in order to obtain a laser-active plasma. The efficiency of the laser, defined as quotient of optic performance and electric power input, is, typically, as low as 0.1%. This is due, among other things, to the rather inefficient excitation mechanism (Kneubühl/Sigrist, loc. cit., p. 240).

A typical argon ion laser comprises, in a vessel configured as a tube, a cascade-like electrode arrangement in which a high-intensity arc discharge is excited between the electrodes in the gas filling, which typically has a gas pressure of 0.01–1 mbar, in order to obtain a laser-active plasma with a degree of ionisation in an order of magnitude of $10^{-4}$ to $10^{-2}$. The efficiency of an argon ion laser is likewise very low, being less than 0.1%. The beam quality, for example the beam jitter and its maximum intensity, depend on the age of the tube. Due to interaction between the plasma and the tube, the life of the tube is heavily restricted, being typically only 2000 hours for a laser power of 20 W. At the end of that time, the tube, which costs some ten thousand D-marks, must be replaced. In addition, the tube requires intensive cooling, the cooling power being typically in the range of up to 40 kW. It has been known in connection with an argon ion laser to apply a longitudinal magnetic field, i.e. a magnetic field that extends in parallel to the longitudinal axis of the laser tube, in order to concentrate the discharge on the axis and to reduce the damaging effects the plasma has on the tube wall (Kneubühl/Sigrist, loc. cit. p. 246). However, this measure is only little effective and has not succeeded in increasing the efficiency of the laser to over 0.1%.

$CO_2$ lasers are excited by direct-current discharges or electromagnetic fields in the radio-frequency range, depending on the particular design. Their efficiency is, typically, between 10% and 15%, depending on the particular design and operating mode.

The present invention has for its object to improve the efficiency of gas lasers and extend the life of the container that encloses the laser-active medium.

This object is achieved by a gas laser having the features defined in claim 1. Advantageous further improvements of the invention are the subject-matter of the sub-claims.

BRIEF DESCRIPTION OF THE INVENTION

Gas lasers comprise a container intended to receive a gas or a gas mixture as laser-active medium, the container having an axis along which the gas laser emits its laser radiation. For exciting the laser-active medium, a source, associated to the container, of an electromagnetic alternating field is used to produce a plasma in which the electromagnetic alternating field is injected into the laser-active medium in the container. For producing a magnetic field in the container, a group of at least two pairs of magnet poles is provided, with the poles extending at a distance from, and along the axis of the container and being arranged around the axis with alternating polarity so that the magnetic field emanating from them exhibits an intensity sink in the region of the axis. As a result, a plasma column is produced which represents the essential portion of the laser-active volume, the geometric dimensions of which are determined by the confinement of the plasma in a static or slowly variable magnetic multipole field. Using energy irradiated and/or injected from the electromagnetic alternating field, electric fields with azimuthal or axially parallel components are produced that cause the plasma to become denser in the magnetic multipole field.

This provides the following essential advantages:

Due to the interaction between the charge carriers present in the plasma and the magnetic field and the electromagnetic alternating field, the charge carriers, especially the electrons are driven away from the container wall and toward the container axis, where the magnetic field exhibits an intensity sink and, preferably, disappears. This greatly reduces interaction between the plasma and the container wall.

The reduced interaction between the plasma and the container wall has the result to extend the life of the container.

As a result of the reduced interaction between the plasma and the container wall, the degree of heating-up of the latter, and thus the cooling power required, are reduced.

The reduced interaction between the plasma and the container wall reduces the level of absorption of gas components by the container wall and, as a result thereof, maintains the optimum composition and the optimum pressure of the gas over a longer period of time.

Due to the reduced interaction between the electrons of the plasma and the container wall, more electrons, and electrons of higher energy are available for gas-exciting collisions, whereby the efficiency of the laser is increased.

Because the electrons of the plasma are driven into the intensity sink of the magnetic field, the electron density and the collision probability of the electrons increases in that region so that the light yield and, with in, the efficiency of the laser, increase. First test have shown that compared with the prior art the efficiency of, for example, an argon ion laser can be increased by a factor of ten to twenty.

As a result of the concentration of the excitation-triggering electrons in the near environment of the axis of the container, the zone emitting the laser radiation becomes narrower so that the laser beam becomes thinner and more intensive.

As a result of the reduced interaction between the plasma and the container wall and the increase of the electron density in the near environment of the container axis, a rise in electron temperature (kinetic energy of the electrons) occurs in this region, which temperature may be further increased by an increase in amplitude of the electromagnetic alternating field. The increase in amplitude of the electromagnetic alternating field in turn is facilitated by the reduced interaction between the plasma and the container wall.

The invention renders possible a higher electron temperature, which in turn permits the excitation of higher energy levels and, thus, laser radiation with shorter wave lengths, down to the roentgen range.

The high electron temperature, that can be reached with a relatively low HF power, leads to a considerably lower build-up threshold of the laser, from an energetic point of view.

The invention permits plasmas to be generated in the laser container, in which the electron temperature is much higher than the ion temperature, which is desirable as such.

The reduced interaction between the plasma and the container wall permits the use of containers made from materials that are less resistant, less temperature-resistant, less toxic and cheaper than beryllium oxide, the material frequently used for argon ion lasers.

The effectiveness of the magnetic field, which in combination with the electromagnetic alternating field concentrates the plasma and, especially, its electrons in the intensity sink of the magnetic field, rises with its gradient transverse to the container axis. It is, therefore, favourable if the magnetic field disappears in the region of the container axis, while being as high as possible at the edge of the container, the intensity of the magnetic field being solely limited by technical constraints in connection with the generation of the magnetic field and by financial constraints. Magnetic fields with an intensity of more than 10 Tesla will not be used for cost reasons; magnetic fields with an intensity of between 0.1 and 2 Tesla at the pole shoe surface, especially between 0.1 and 1 Tesla, represent a good compromise between the strength of the magnetic field and the cost of its generation.

While in principle the magnetic poles may be located within the laser container, they are, preferably, located outside the container. In principle, the magnet may be a permanent magnet. Because of the high field strengths achievable, electromagnets are, however, preferred. These may be excited by direct current or alternating current, especially by alternating current which is available with 50 Hz as a standard in Europe, and with 60 Hz as a standard in the USA so that a low-cost magnet structure can be realised. In cases where the electromagnets are excited by alternating current, rather than by direct current, the frequency of the exciting alternating current should, however, be small compared with the frequency of the electromagnetic alternating field used to generate the plasma and to excite the laser-active medium, because the desired focusing effect of the magnetic field is optimally achieved if it is slowly variable only, or quasi-static, compared with the frequency of the electromagnetic alternating field used for generating the plasma.

Conveniently, the electrons of the plasma are concentrated, by their interaction with the magnetic field and with the electromagnetic alternating field, in a substantially straight-line region, with the laser radiation being emitted in the latter's lengthwise direction. It is, therefore, preferred that the axis, in the near environment of which the electrons are concentrated, is both an axis of symmetry of the arrangement of the pairs of magnet poles and an axis of symmetry of the container.

In the simplest case, the container is a tube, especially one of circular cross-section. However, tubes with rectangular or square cross-section or even with a cross-section corresponding to the cross-section of the radiant plasma column that results from the interaction of the plasma with the magnetic field and the electromagnetic alternating field, are also possible (see for example FIG. 2).

According to the preferred embodiment of the invention, a magnetic four-pole (quadrupole) field is generated which exhibits an intensity sink on the axis of the laser container. In this case, two pairs of magnet poles are arranged, preferably symmetrically, around the container axis. However, it is also possible to work with a six-pole field or with an eight-pole field. Using more than eight magnet poles arranged around the axis causes additional costs, but brings no relevant advantage so that it is preferred to arrange maximally eight poles (four pairs of magnet poles) around the axis.

The magnets may have pole shoes extending continuously over the entire length of the space in the laser container provided for excitation of the gas. In case of greater lengths, it may however be more economic and easier in technical terms to arrange several groups of magnet pole pairs one behind the other along the container axis, in which case such groups should, conveniently, be identical one to the other.

The electromagnetic alternating field, which has the function to generate a plasma whose electrons are capable of absorbing sufficient energy in the electromagnetic alternating field for exciting the desired energy level in the laserable gas, can be generated in different ways. One of such ways consists in using, as a source of the electromagnetic alternating field, a coil that surrounds the container and that is part of an electric oscillating circuit which latter is fed by a frequency generator. Preferably, the coil surrounds the container only over part of its length so that the plasma, being stimulated to radiate, is kept free not only of the circumferential wall of the laser container, but also of its two end walls, in order to minimise also the stresses acting on the end walls of the container and to minimise the losses of charge carriers of the plasma caused by the charge carriers hitting the end walls of the container. The coil windings, being conveniently arranged outside the container of the gas laser, should however enclose the region of the axes of the multipole field emanating from the poles.

Another way of generating an electromagnetic alternating field in the container consists in providing two or more than two electrodes in the container and of making such electrodes part of an electric oscillating circuit which is fed by a frequency generator. In this case, the gas discharge and the resulting generation of plasma take place between the electrodes. In order to permit extraction of laser radiation in this region, the electrodes are conveniently provided with a hole, a recess, perforation or a similar passage in the region of each axis of the multipole field, through which the laser light can pass and eventually leave the container through an extraction window.

A combination of the described two possibilities, which employs a mixture of azimuthal and longitudinal excitation of the plasma (claim 22) is likewise possible and provides the advantage to increase the injected power.

The electromagnetic alternating field may be a LF field, a HF field or a microwave field. The frequency of the electromagnetic alternating field should be at least 50 Hz, although frequencies from the KHz range up to the GHz range are preferred.

The source of the electromagnetic alternating field may also consist of a frequency-adjusted and, thus, resonant, cavity which encloses the spatial region of the laser-active plasma, and which is part of a HF generator or a microwave generator. The basic structures of cavity resonators suited for this purpose are known in microwave technology.

The invention is suited for both, continuously operated lasers (CW lasers) and pulsed lasers. In the case of a pulsed laser it is of advantage to provide means for the permanent generation of gas discharges in combination with means for the pulsed energy supply into the plasma so that the pulsed energy supply into the plasma, which eventually produces the population inversion in the higher energy levels, can be superposed upon the permanent gas discharge, especially a HF frequency or microwave frequency discharge. The permanent HF discharge leads to higher pre-ionisation of the gas and, as a result thereof, to especially homogeneous plasmas. This embodiment of the invention is especially suited for UV lasers.

For pulsed operation of the laser, electrodes are conveniently provided in the laser container, which limit the length of the plasma column in the container and which are part of a circuit in which a re-chargeable capacitor can be discharged via a quick-acting electronic switch and via the electrodes. Suited for use as a quick-acting electronic switch is a thyratron, a thyristor or a pseudo spark switch. A suitable pseudo spark switch has been disclosed in EP 0 324 817 B2. Instead of the electrodes, a coil surrounding the laser container may also be provided through which the capacitor of the circuit is discharged.

Suited as filling gases for the laser container are, above all, rare gases or mixtures of rare gases from the group of helium, neon, argon, xenon and krypton, and in addition carbon dioxide, each with the usual admixtures. A carbon dioxide laser preferably further contains nitrogen and helium or nitrogen and neon, and is used for generating a laser radiation with wave lengths of 9.4 $\mu$m and 10.4 $\mu$m. For higher powers, the gas fill in the $CO_2$ laser is conveniently circulated and cooled, the gas flowing through that part of the container in which the gas discharge occurs, either in longitudinal or in transverse direction. In the case of a rare-gas fill, especially an argon ion laser, the high electron temperatures (kinetic electron energy) rendered possible by the invention may also excite laser transitions in single-charge or multiple-charge ions, whereby a particularly short-wave laser radiation can be produced. A further increase of frequency is possible by doubling or multiplying the frequency of the emitted laser radiation by means known from non-linear optics. This is so because non-linear optic crystals permit harmonics of the radiation irradiated into the crystal to be produced, a phenomenon that is known as such for doubling the frequency in UV lasers. For further details regarding the technique of frequency multiplication, reference is made to Y. R. Shen: "The principles of non-linear optics", Wiley Publishers, N.Y., 1984.

The high electron temperatures rendered possible by the invention, and the frequency multiplication technique make is possible to enter a field in which gas lasers according to the invention work as roentgen lasers. Such lasers are particularly well suited for working and producing very fine structures, including difficult medical operations, especially on eyes, and for treatments on skin.

DESCRIPTION OF THE INVENTION WITH REFERENCE TO THE DRAWING

FIG. 4b shows a cross-section through the laser according to FIG. 4a;

Identical or corresponding elements are identified in the different Figures by the same reference numerals.

Figure 1:
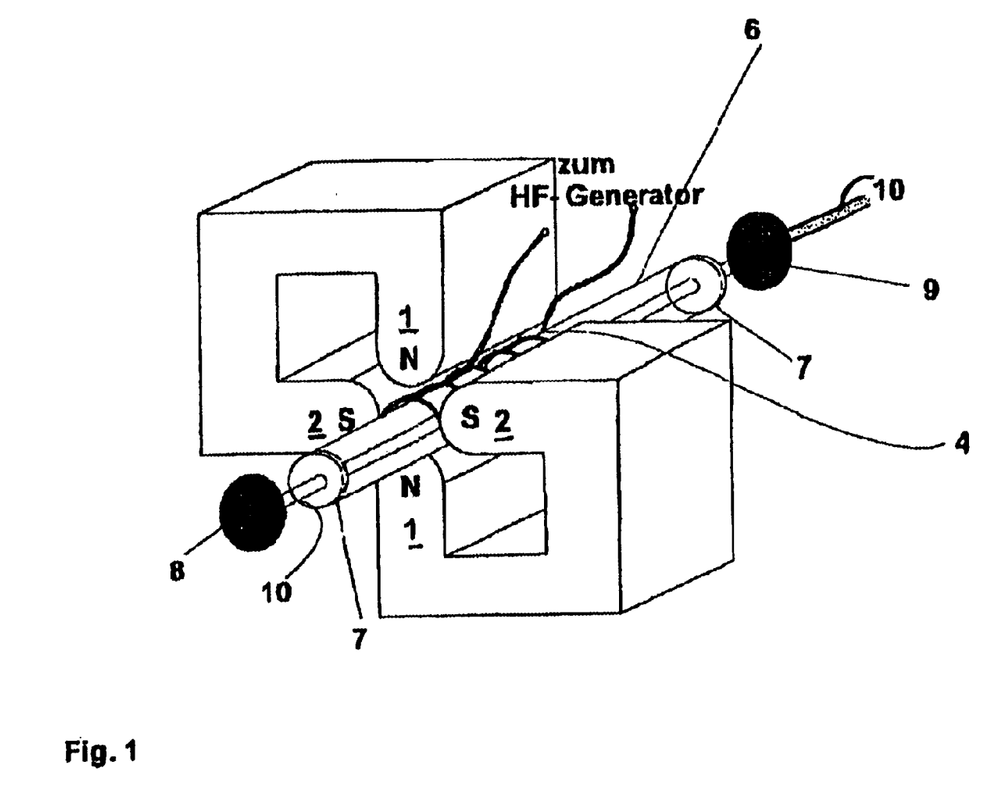
FIG. 1 shows an oblique view of an arrangement of those elements of a gas laser which are the most important for the invention, for the case where the plasma is excited by a coil.
Figure 5A:
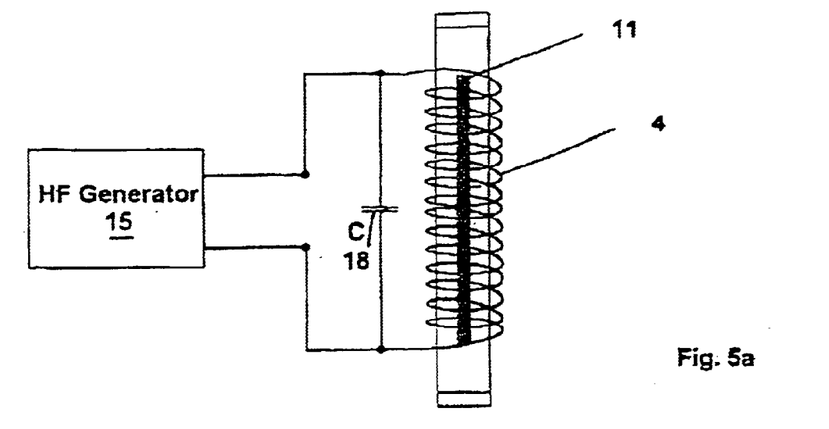
FIG. 5a shows one way of HF injection into the container of a gas laser by means of a coil surrounding the container.
Figure 5B:
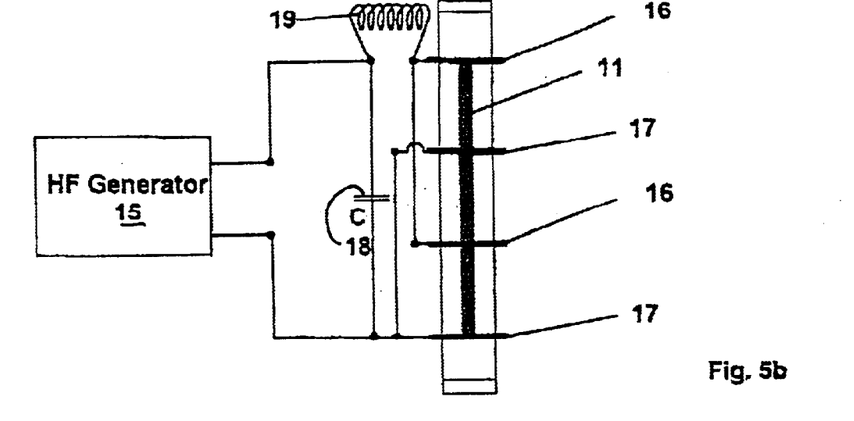
FIG. 5b shows the possibility to inject HF into the container of a gas laser through electrodes arranged in the container.

FIG. 1 shows a gas laser with a container 6 in the form of a cylindrical tube made from glass or a ceramic material, the ends of which are closed by extraction windows 7, preferably in the form of Brewster windows. A concave mirror 8 is provided at a certain distance from the one window, and a partially transmitting plane mirror 9 is arranged at a certain distance from the opposite window 7. The container 6 is surrounded, over part of its length, by a coil 4 which latter is connected to a HF generator 15 (FIGS. 5a and 5b). The coil serves for injecting an electromagnetic HF field. Further, a group of four magnet poles 1 and 2 is arranged around the container 6, in the same region in which the container 6 is surrounded by the coil 4, the pole shoes of such poles extending in parallel to the longitudinal axis (z-axis) 14 of the container 6 and generating, with the alternating polarity of their arrangement, a four-pole field that disappears on the axis 14. In the simplest of all cases, the magnets may be permanent magnets although, preferably, they are electromagnets excited by windings that may be applied to the legs of the magnets in a suitable manner.

Figure 4A:
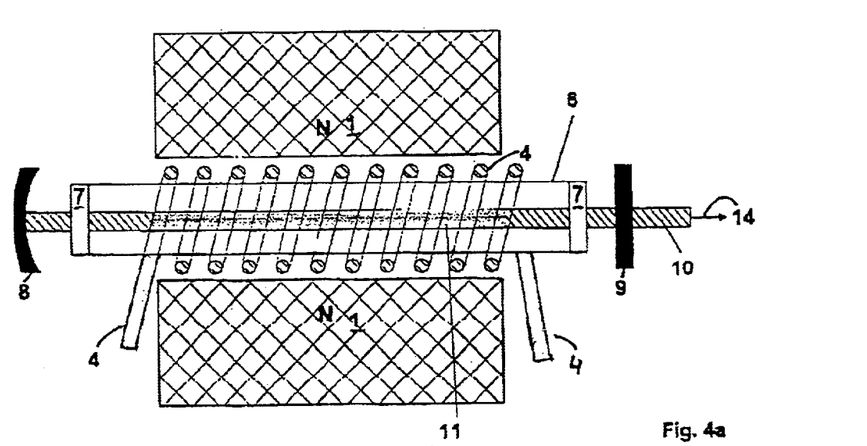
FIG. 4a shows a longitudinal section through a gas laser having a similar structure as the one illustrated in FIG. 1.
Figure 4B:
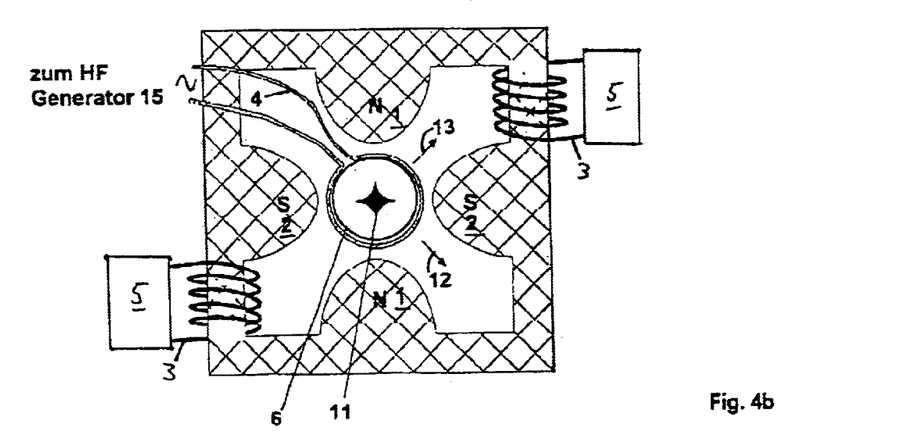

The embodiment illustrated in FIG. 4a and 4b differs from the embodiment illustrated in FIG. 1 essentially only in that the four magnet poles 1 and 2 do not belong to two separate magnets, but rather to a single closed magnet arrangement which is excited by two windings 3 by means of a direct-current or alternating current source 5.

By having an electromagnetic HF field injected into the gas fill of the container 6 by means of the coil 4, a HF discharge is produced in the container which creates a plasma the electrons of which are concentrated, over the length of the coil 4, in the near environment of the axis 14 by interaction with the HF field and with the magnetic field, which latter may be a static magnetic field or a slowly variable magnetic field. It is the plasma column concentrated in that near environment of the axis 14 which is excited with the aid of the two mirrors 8 and 9 to emit a laser beam 10.

Figure 2:
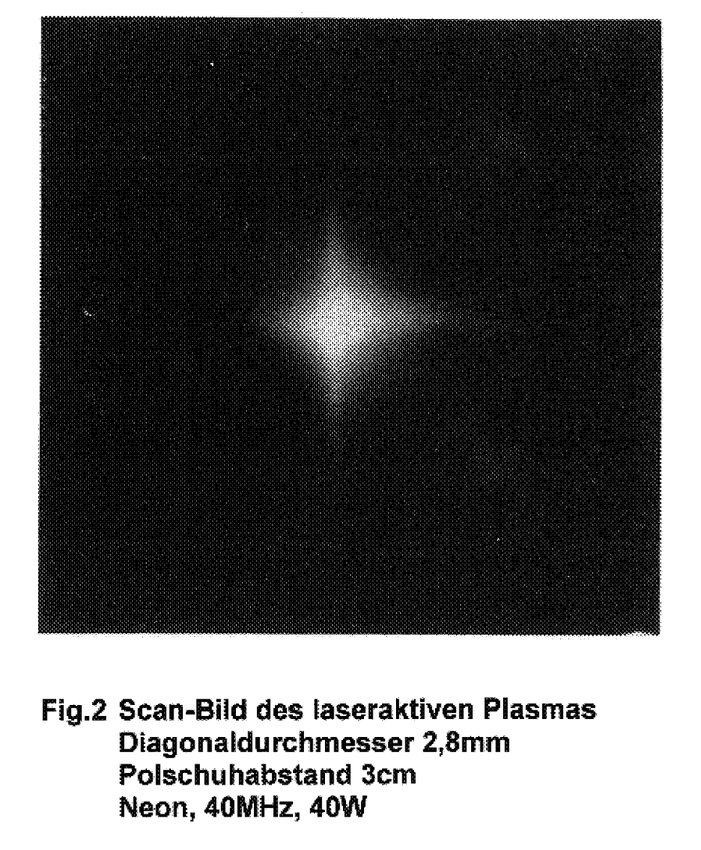
FIG. 2 shows a typical scanned image of an original photo taken of the plasma radiation in such a laser.

FIG. 2 shows the scanned image of the laser-active plasma for a neon laser with a pole shoe spacing of 3 cm, which has been excited with an electric energy of 40 W at 40 MHz. The image shows clearly the contraction of the laser-active plasma to the region of the z-axis 14. The diagonal diameter of the radiant plasma column was determined to be 2.8 mm. The diagonal diameter is defined as the diameter of the plasma column in the direction of the x-axis 12 or the y-axis 13 (see FIG. 4b). In FIG. 4a, the contraction is illustrated by means of a grid system, whereas FIG. 4b shows the cross-sectional shape of the radiant plasma column typical for a four-pole field, in good correlation with the scanned image according to FIG. 2. The diagonal diameter of the gas container was 2.6 cm so that the diameter of the radiant plasma column is only about 1/10 of the diameter of the container 6. The photo was taken during excitation with 40 MHz and a HF power of 40 W, with a length of the quadrupole arrangement of 10 cm.

The theoretical value of the diagonal diameter of the plasma column 11 (FIG. 4a) will be referred to in Appendix A1.

FIGS. 5a to 5b show different ways of HF injection. The containers 6, in which the discharge occurs, are illustrated in all four Figures. In addition, the location of the radiant plasma column 11 is indicated in each Figure. Except for the components required for excitation, no other components of the gas laser (mirrors, the magnetic multipole arrangement, the extraction windows) are shown.

According to FIG. 5a, the container 6 is surrounded by a coil 4 being part of an oscillating circuit including the capacitor 18, as can be seen in FIG. 1. The oscillating circuit is fed by a HF generator 15.

According to FIG. 5b, two pairs of electrodes 16 and 17 are arranged in the container 6, which are part of an oscillating circuit comprising a series-connected coil 19 and a capacitor 18 connected in parallel. The oscillating circuit is fed by a HF generator 15. The electrodes are pierced to permit the passage of laser radiation. In one practical example, the electrodes were configured as hollow cylinders.

Figure 5C:
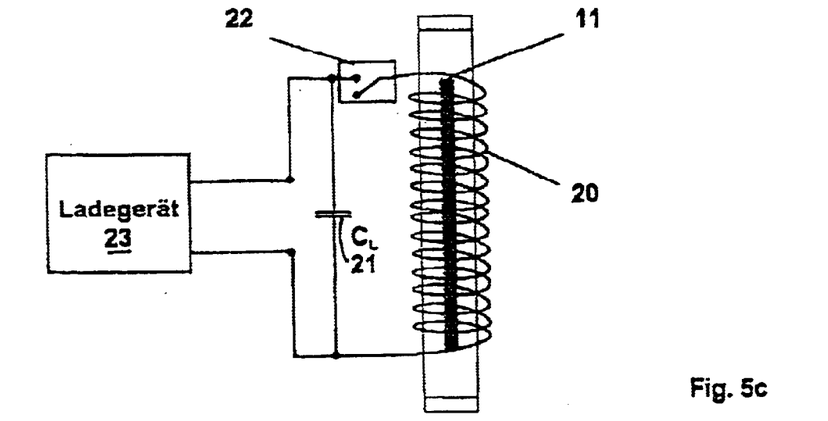
FIGS. 5c and 5d show a possibility of achieving pulsed excitation of the plasma.

FIG. 5c shows an arrangement for pulsed operation of a gas laser. The container 6 is surrounded by a coil 20 through which a charging capacitor 21 can be discharged via a quick-acting electronic switch 22. The switch 22 permits pulsed operation. A charger 23 is provided for charging the charging capacitors 21.

Figure 5D:
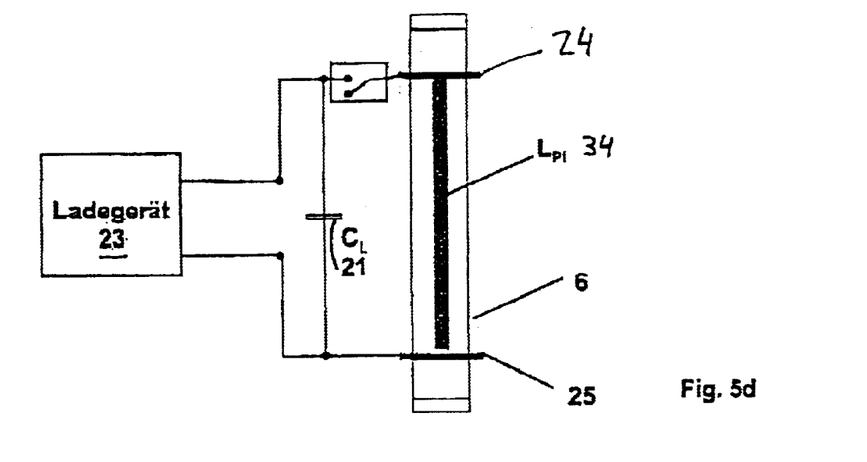

FIG. 5d differs from 5c insofar as there is no coil 20. Instead, two electrodes 24 and 25 are arranged in the container 6, through which the charging capacitor 21 can be discharged.

The arrangement illustrated in FIG. 5d may be supplemented by an arrangement that permits permanent gas discharge of the kind illustrated in FIG. 5a. When such a combination is used, the gas in the container 6 can be pre-ionised by the permanent gas discharge, and can then be ignited by the circuit illustrated in FIG. 5d. This corresponds to the operation described in claim 30.

Figure 5E:
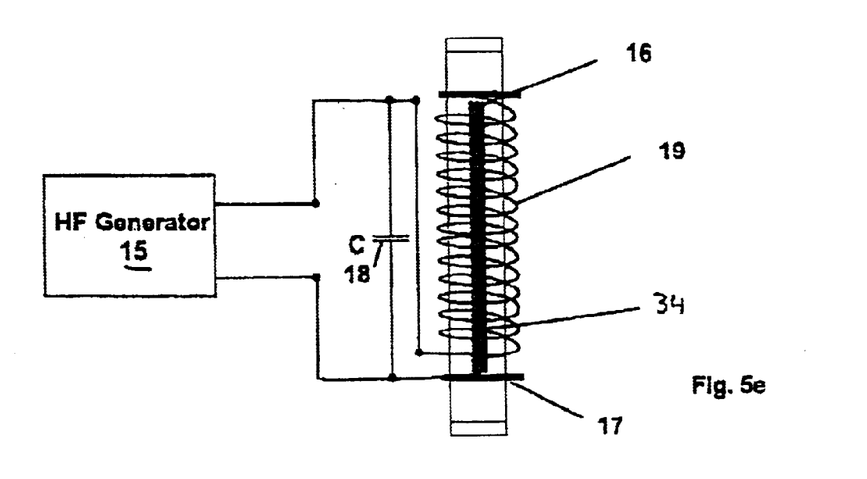
FIG. 5e shows one way of achieving mixed azimuthal and longitudinal HF excitation of the plasma.

The arrangement illustrated in FIG. 5e differs from the one illustrated in FIG. 5b insofar that instead of two electrode pairs, a single electrode pair 16, 17 is provided only and that the oscillating-circuit coil 19 surrounds the plasma distance 34 between the electrodes 16 and 17 in the container 6. This embodiment of the invention provides for mixed HF excitation of the plasma, i.e. both azimuthal and longitudinal excitation. With this kind of excitation, the HF currents in the plasma and the electric HF field flow along spiral lines. The HF voltage present at the electrodes 16 and 17 is determined in part by the self-inductance of the plasma flow, as in the case of the embodiment of FIG. 5c. The advantage of this arrangement lies in an increase of the power injected into the plasma.

Figure 6:
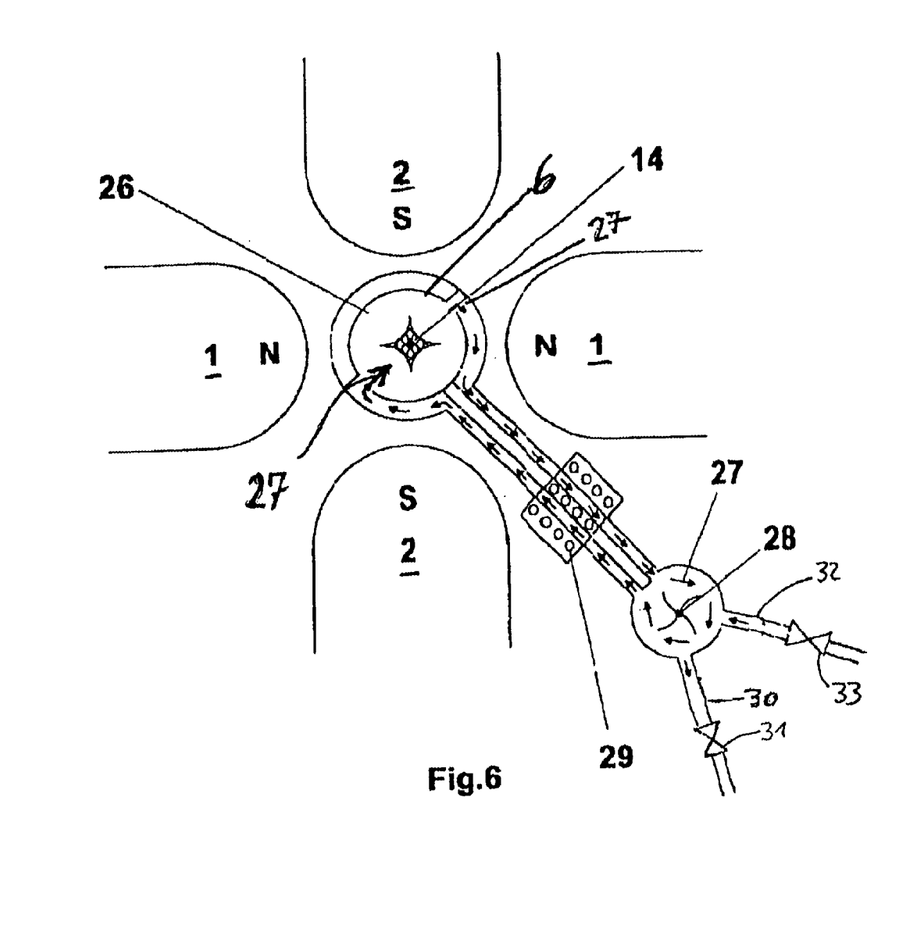
FIG. 6 shows a $CO_2$ laser with gas circulation.

FIG. 6 shows, in a diagrammatic representation, the structure of a $CO_2$ laser with gas circulation. The region 26, in which the gas discharge occurs, is passed by the flow in crosswise direction, as indicated by arrows 27. The plane of representation has been selected in such a way that the axis 14, along which the laser radiation is emitted, extends perpendicularly to that plane. A blower 28 is provided for circulating the gas. A heat exchanger 29, serving to cool the gas, is provided in the flow path of the gas. Further, there is provided a discharge line 30 that can be closed by a valve 31 and through which dissociation products of the $CO_2$ can be evacuated. Fresh gas mixture, containing $CO_2$ and any other admixtures, such as nitrogen and helium, that may be used, can be introduced into the circuit through a supply line 32 with an integrated shut-off valve 33.

In a conventional $CO_2$ laser the plasma column is distorted by the gas flow passing the container 6 in transverse direction. In contrast, according to the invention, the plasma column is concentrated on the axis 14 by concentration of the electrons in the near environment of the axis 14, as illustrated in FIG. 6, so that the laser-active part of the plasma also finds itself in that region. The dissociation products produced in the laser-active plasma tend to remain in the near environment of the axis 14. This is counteracted by circulating the gas in a direction transverse to the axis 14, which kind of circulation is, therefore, regarded as advantageous compared with a longitudinal circulation of the gas along the axis 14 which would likewise be possible. The discharge line 30 and the supply line 32 not only permit dissociation products to be removed, they also provide the possibility to control or regulate the gas pressure in the container 6, preferably in a manner which ensures that the mean electron temperature $T_{el}$ in the plasma is defined by the equation $kT_{el}=0.3$ eV, because this is optimal for both the excitation mechanism and the efficiency of the $CO_2$ laser. "k" is Boltzmann's constant.

In operation of gas lasers according to the invention with a quadrupole magnet arrangement, one proceeds as follows (see FIG. 1):

The energy supplied into the laserable gas occurs by injection of a HF current or LF current (maybe without electrodes), e.g. 0.1–100 kW, frequencies from 50 Hz up to >100 MHz for CW operation and/or high-power injection in pulsed operation with HF pulses up to 100 MW (typically around 1 MW).

As a result, the HF plasma generated by the high frequency is magnetically confined by a magnetic quadrupole field (FIG. 1). The length of that magnetic field along the laser beam direction 14 is freely selectable. The pole shoe distance typically is a few cm, the magnetic field arrangement can be operated with direct current or conventional alternating current.

Once the igniting amplitude of the HF field (or the NF field) is exceeded, multiplication of the charge carriers and, thus, heating-up of the electron component of the plasma occurs almost exclusively within a spatial region having a diagonal diameter of $D_{1/2} \approx$ a few millimetres. This value changes only with the fourth root of the electron temperature; for laser operation in an Ar ion laser, this is approximately $kT_{el} \approx 0.3$–2 eV (in extreme cases up to approximately $10^2$ eV). FIG. 2 shows a photo of that plasma (40 MHz, irradiation with 40 W). For a detailed discussion of than behaviour, a deeper insight into the operation of the multiplication of charge carriers and some knowledge about electron orbits in the field region and about the compression of the plasma occurring due to radial forces resulting from the particle flows produced by the high frequency are required. These are discussed in Appendices A1 to A3. In cases where the HF energy is injected into the plasma inductively or capacitively without any electrodes (FIG. 5a), but also in cases where electrodes are provided in that region (FIG. 5b), the energy loss at the walls can be kept very low by minimising the plasma/wall contact surfaces, and also by operating the gas laser at the upper pressure limit (see below). In this way, the existing HF energy is transferred to the plasma within a narrow spatial region, and a high electron temperature can be generated in the plasma. According to the SAHA formula, this leads to a high degree of ionisation in the plasma, which is directly correlated to the efficiency of gas lasers, for example of rare-gas ion lasers.

Based on the behaviour of the plasma, as illustrated in FIG. 2, the invention can be described as follows:

The plasma column so formed is located in the laser resonator (FIG. 4a), where direct contact of the plasma with the extraction window 7 and the resonator mirrors 8, 9 and other optical components (not shown) provided in the resonator should be kept as small as possible (especially in the case of high-intensity laser systems), for example by providing a distance (FIG. 4) between the windows 7 (or the mirrors 8, 9 and other optical components, if these should be provided in the container 6, or should be used to close off the container in the particular case) and the plasma 11. The high electron temperature, which according to the invention can be achieved with relatively low HF power, leads to a considerably lower, energetically, build-up threshold of the laser compared with conventional gas lasers.

The contraction of the plasma 11 observed under the influence of the combination of a magnetic quadrupole field and high-frequency excitation of the plasma 11, is the result of the interaction between particle flows, formed by the high frequency, especially their time-variant portions, and the magnetic gradient field, especially in the neighbourhood of the axis 14, which latter simultaneously is a quadrupole axis. The main factor in this connection is the force upon a flow element parallel to the axis 14 of the magnetic quadrupole field, especially in the magnetic sector fields in the region around the diagonal planes of the quadrupole (FIG. 3), which are defined on the one hand by the axis 14 of the quadrupole field, also described as z-axis in connection with FIG. 4a FIG. 5a, and on the other hand by the axes described as x-axis 12 and y-axis 13 in FIG. 4b, that extend perpendicularly to the z-axis 14. A current path, for example an axially parallel current path, is subjected in this case to a force proportional to $\vec{j}_{HF} \times \vec{B}_{Quadrupole}$ directed toward the z-axis 14 in the one half-wave of the high frequency, and in outward direction in the opposite half-wave of the high frequency. The outwardly directed force acting on the same current path is always lower than the inwardly directed force, since in the quadrupole field the B field rises toward the outside in linear relation to the distance from the z-axis 14. In the one half-wave of the high frequency, the current path moves to the outside, in the other half-wave of the high frequency it moves more strongly toward the inside. In this manner a plasma region passed by current is driven toward the z-axis 14 during only a few periods of the high frequency.

An important aspect of the invention relates to the multiplication of charge carriers. Experiments show that this occurs almost exclusively in a narrow spatial area with a diagonal diameter $D_{1/2}$ of a few millimetres, especially in a spatial region with a diagonal diameter $D_{1/2}$ of approximately 3 mm. Since the energy required for excitation can be injected into the plasma with high efficiency, this means that, according to the invention, energy losses occur to a very small extent only, namely by particle bombardment at the container wall in the neighbourhood of the pole shoes 1, 2 adjacent the gas container 6. The quadrupole field acts on the plasma like a magnetic mirror and compresses the plasma along the z-axis 14 so that only a small portion of the electrons can reach the container wall. This explains the small energy loss and small gas loss of a laser according to the invention as compared with conventional gas lasers where high particle losses and energy losses occur due to the electron bombardment on electrons in the container and on the container wall 6.

Figure 3:
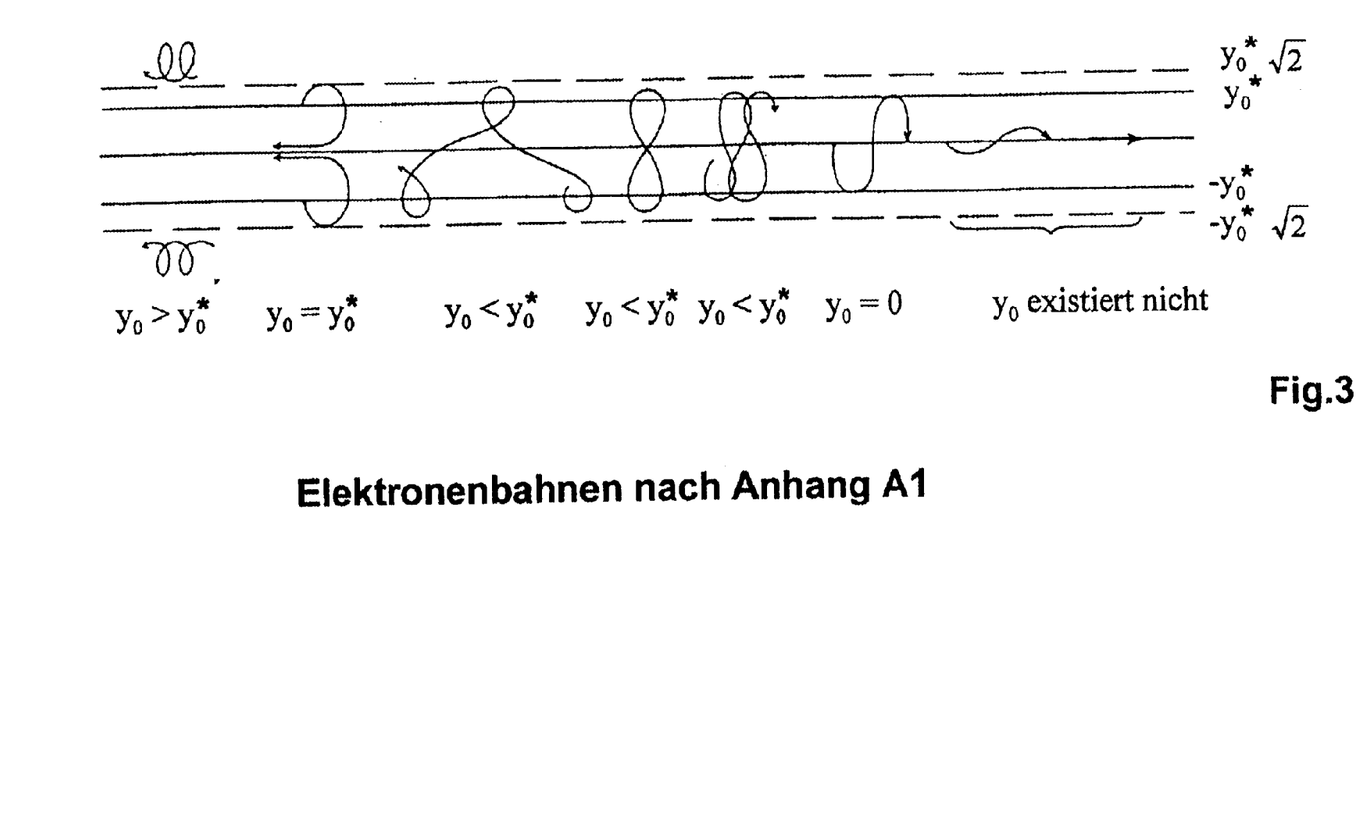
FIG. 3 shows a diagrammatic representation illustrating the electron orbits occurring in a four-pole field, according to Appendix 1.

Another aspect of the invention relates to the diameter of the plasma column 11. The radius of curvature $\rho$ of the electrons, at the thermal velocity $V_{th}$, is $$\rho = \frac{mv_{th}}{eB}$$

in the magnetic field B. If one now subdivides the field region into an outer space, in which the before-described inwardly driving forces are active, and into an inner space, in which the electrons "oscillate" about the z-axis 14, then the limit between these two regions, at a distance $y_0^*$ from the z-axis 14, is defined by $y<y^*_0$ (inner space) and $y>y^*_0$ (outer space), see FIG. 3. At the boundary $y=y^*_0$, the radius of curvature $\rho_0^*$ for an electron with $v=v_{th}$ is just equal to half the distance from the z-axis where y=0. Taking $$B = B_Q \frac{y}{d},$$

then $$B^* = B_Q \frac{y_0^*}{d},$$

so that $$\rho_0^* = \frac{mv_{th}}{eB^*} = \frac{mv_{th}d}{eB_Q y_0^*}$$

and taking $2\rho^*_0 = y^*_0$, then (see Appendix A1)

$$2\rho_0^* = y_0^* = \sqrt{\frac{2mv_{th}d}{eB_Q}}$$

wherein $B_Q$ is the maximum magnetic field present at the pole shoes 1,2. Experiments show that this value $y_0^*$ is also equal to half the diameter observed of the radiant zone 11 of the plasma (FIG. 2)—compare the representation of the plasma column 11 in FIGS. 4a and 4b.

As $v_{th}$ is proportional to $\sqrt{kT_{el}}$ this means that the diameter of the electron plasma scales at a factor equal to the fourth root from the electron temperature and the square root from the maximum field $B_Q$ (at the pole shoe). This means, however, that the concentration of the hot electron plasma in a narrow space, resulting from the invention, is "weakened" only at the fourth root from $T_{el}$, and this even at extremely high electron temperatures; the column 11 of the electron plasma, contracted by the magnetic four-pole field, expands only at the fourth root from the electron temperature $T_{el}$. On the other hand, that diameter of the column 11 of the electron plasma decreases at the square root of the magnetic field $B_Q$, so that basically new innovative concepts for applications at high power densities can be expected for gas lasers, especially for Ar ion lasers with superconductive quadrupole arrangements, for the generation of strong magnetic fields with a magnetic induction $B_Q$ of, for example, up to 8 or 10 Tesla. In the present case, a 40 W HF discharge of 40 MHz in an argon ion laser already resulted in an electron temperature in the plasma column 11 of approximately 0.3 eV, corresponding to $T_{ef} \approx 3000$ K. According to the SAHA formula, one achieves a degree of ionisation of approximately 10% for $kT_{ef} \approx 1$ eV. This shows that the efficiency of the laser according to the invention is much higher than that of a conventional Ar laser. Since there is no essential barrier for the maximum electron temperature, it is now possible to generate highly ionised plasmas which should permit a laser power of up to several 100 W to be reached in the suitable pressure range of an Ar laser operated in the CW mode! On the other hand, the invention opens up a new possibility to achieve pulsed HF irradiation, where laser pulses can be expected with times of $10^{-8}$s to $10^{-6}$s at high pulse frequency and laser powers of up to 500 kW in the pulse range. This permits the production of Ar lasers that can be frequency-doubled or frequency-multiplied by means of the known methods of non-linear optics so that basically new and advantageous lasers and laser applications can be opened up with respect to both the power range of the lasers and the range of applications of UV lasers and roentgen lasers.

For implementing the invention, it is necessary to determine a suitable pressure range in the gas container. The filling pressure is optimal, from the viewpoint of the plasma column, when the free path length for the elastic collision between an electron and a neutral atom is approximately equal, for thermal electrons, to a value $2\pi$ times the gyration radius in the magnetic field region of the periphery of the plasma. This is the case with Argon for $B_Q = 1T$ and $$\frac{mv_{th}^2}{2} \approx 1eV$$

for gas fill pressures of somewhat below 0.5 mbar.

For implementing the invention, the HF energy must be injected into the space region 11 filled by the laseractive volume, in the domain around the four-pole axis 14. This is explained by FIGS. 5a, b. The frequency $V_{HF}$ of the HF circuit (FIGS. 5a, b) is defined by the formula $$2\pi v_{HF} = \frac{1}{\sqrt{L_{ges} C_{ges}}}$$

where $L_{ges}$ and $C_{ges}$ describe the total inductance and capacitance active in the oscillating circuit. From this, the reactance of the oscillating circuit can be derived to be $$R_{blind} = \sqrt{\frac{L_{ges}}{C_{ges}}},$$

which is higher for all relevant plasmas than the resistance $R_{plasma}$ building up stationarily in the ignited plasma zone. The quotient $G = R_{blind}/R_{plasma}$ is known as the quality of the oscillating circuit. Injecting the energy from the HF field can be effected longitudinally via electrodes 16, 17, as illustrated in FIGS. 5b and 5d, or azimuthally, for example via a coil 4 arranged within the gas volume or outside the latter, as shown in FIGS. 5a and 5c. A combination of longitudinal and azimuthal injection of the HF field is also possible, see FIG. 5e.

When the HF field is injected longitudinally, the charged particles are subjected to the action of inwardly driving forces, under the influence of the Lorentz force, and these forces have a strong focusing effect; the laseractive plasma excited by the high frequency is compressed in the region of the axis. The diameter of the radiant plasma column to be observed is only a few millimetres, for example 6 to 8 mm. The HF voltage applied in the resonance case $$v_{HF} = \frac{1}{2\pi} \frac{1}{\sqrt{(L_{pl} + L_1) \cdot C}},$$

in case the field is injected according to FIG. 5b, is then equal to $$I_{HF} \cdot R_{imp} \cdot \frac{L_{Pl}}{L_{pe} + L_1} \text{ with } R_{imp} = R_{BLIND} \cdot G$$

Due to the relatively high impedance value $R_{imp}$, particularly effective energy injection is reached with this circuit arrangement.

The oscillating circuit can be operated also with $L1=0$, i.e. with the self-inductance of the plasma. This applies especially to pulsed lasers according to FIG. 5d.

In the case of azimuthal injection, the Lorentz force acting on the induced plasma flows disappears because $j_{HF}$ is directed largely parallel to the magnetic field of the quadrupole. The magnetic field gradient produces, however, an ambipolar particle drift toward the quadrupole axis which in this case substantially coincides with the axis 14 of the container 6. This is so because the electrons perform, for example, a spiral-shaped drift movement in the direction of axis 14, with the probability density along the particle orbit being the greatest near the axis 14. Collisions then trigger diffusion toward the axis 14. The result can be seen in FIG. 2.

In the high-frequency range, the laserable volume is limited by the skin effect which leads to (not always undesirable) limitations regarding the shape of the laser beam profile. The injection of HF energy at very high frequencies is conveniently effected via suitably sized cavities. This likewise applies to the microwave domain. At the lower frequency limit, the frequency generator may then be replaced by a cheaper alternating-current generator. Azimuthal injection is effected at the lowest possible frequencies, for example at frequencies down to conventional alternating current with a frequency of 59 Hz. The most economical frequency range is around 100 kHz, for which semiconductor-based frequency generators are available.

With respect to CW operation, in addition to single-charged argon ion lasers, multiple-charged rare-gas ion lasers, such as $Ar^{2+}$ and also $Ne^{1+}$ and $Ne^{2+}$ are of special interest, in addition to single-charged argon ion lasers, because due to the high efficiency of lasers according to the invention at electron temperatures of 1 eV to 5 eV, their high energy levels can be reached also in CW operation with multi-kW generators. Such lasers enter the ultraviolet frequency range.

Pulsed energy supple can be reached by HF pulses of suitable length at sufficiently high frequencies, where the HF pulses can be superimposed, if necessary, to a continuous-wave HF (see claim 29). This permits the laser to be kept continuously shortly below its ignition threshold, which is then exceeded due to the HF pulses. Especially in the case of pulsed $Ar^{1+}$ high-intensity lasers, this permits doubling or multiplying the frequency achievable on the beam, with conventional methods.

Extreme conditions can be reached for VUV systems on the basis of highly charged ions generated in the gas (for example $Ar^{7+}$, $Ar^{8+}$), by extreme pulse amplitudes, for example in HF cavities; applications of interest for such systems exist in medicine (especially for operations on eyes), lithography and x-ray microscopy, where extremely short-wave laser light is desired to permit very fine structures to be produced and/or worked.

Because of the dependency of the active laser volume on $B_Q$, superconductive quadrupole arrangements are also of advantage for this purpose.

APPENDIX

Theoretical Models Describing Certain Phenomena in Connection with the Invention Appendix A1: Particle Orbits For describing the orbits of the electrons xyz coordinates will be used (x=y=0 on axis, z in axial direction ({x=0}→one of the two diagonal planes, {y=0}→the other diagonal plane). Now the projections of electron orbits to the plane {x=0} for collision-free movement of particles at a velocity of $v=v_{th}$ are determined. Thereafter, the orbit coordinates ρ, φ are introduced additionally for a particle of interest, where ρ=radius of curvature of the orbit, φ=angle between the z-direction and the normal line to the projection of the particle orbit, whereafter the projection of each individual orbit to the plane {x=0} can be described (for a sector) if $y_0$ is additionally substituted for φ=0 of the particle, as y-coordinate of the centre of curvature of the orbit projection. The magnetic field at the particle locus y is then defined by:

$$B(y) - B(y_0) = (y - y_0)\left(\frac{(dB)}{(dy)}\right)$$

wherein $$\left(\frac{dB}{dy}\right)_{y=y_0} = \nabla B_0 = \frac{B_Q}{D}$$

(property of the quadrupole field in the diagonal planes) and $$B(y_0) = \frac{B_Q}{D} y_0.$$

Since, on the other hand, $$\rho = \frac{mv_{th}}{eB}$$

(m=electron mass, e=elementary charge) at any point in these planes, $$ds = \sqrt{dy^2 + dz^2} = \rho d\varphi =$$

line element of the particle orbit projections, $$\tan\varphi = \frac{dz}{dy} \text{ and } \frac{dy}{\rho} = \frac{e}{mv_{th}}\{(B(y_0) + (y - y_0)\nabla B_0\}dy = d\varphi \frac{1}{\sqrt{1+\tan^2\varphi}}$$

After integration $$\left(\text{with } \rho = \frac{mv_{th}}{eB(y_0)}\right)$$

and B(y0)=B0 one then obtains $$\frac{1}{\rho_0}\int_{y_0}^{y}\left\{1 + (y - y_0)\frac{\nabla B_0}{B_0}\right\}dy = \int_0^\varphi \cos\varphi\, d\varphi \text{ so that:}$$

$$(y - y_0)^2 + (y - y_0)2\frac{B_0}{\nabla B_0} - 2\rho_0\frac{B_0}{\nabla B_0}\sin\varphi = 0 \text{ and finally}$$

$$y - y_0 = \frac{B_0}{\nabla B_0}\left\{\left(1 + 2\rho_0\frac{\nabla B_0}{B_0}\sin\varphi\right)^{1/2} - 1\right\}$$

as solution.

This results in the following orbit differentials:

$$dy = \frac{\rho_0\cos\varphi d\varphi}{\sqrt{1 + 2\frac{\nabla B_0}{B_0}\rho_0\sin\varphi}} \quad \text{(Equation 1)}$$

$$dz = \frac{\rho_0\sin\varphi d\varphi}{\sqrt{1 + 2\frac{\nabla B_0}{B_0}\rho_0\sin\varphi}} \quad \text{(Equation 2)}$$

Based on the tabulated elliptic integrals, one obtains orbit projections to the y, z plane in the central domain of the field. The degenerated case $$2\rho_0\frac{\nabla B_0}{B_0} = 1 \text{ with } \frac{\nabla B_0}{B_0} = \frac{1}{y_0^*}$$

with $$\frac{1}{2}D_{1/2}$$

characterises the characteristic radius of the plasma column in the magnetic quadrupole field. It describes the asymptotic approximation of the particle orbit projections to the quadrupole axis $$\left(\text{with } \varphi = \frac{3\pi}{2}\right).$$

FIG. 3 shows particle orbits in the quadrupole central region, based on equations 1, 2. This region is characterised by orbits oscillating about the quadrupole axis; more precisely: All electron orbit projections having the mean velocity $v_{th}$ remain within the y-coordinates $y^*_0 \cdot \sqrt{2}$, with a diameter of that zone of $$D_{\frac{1}{2}} = 2\sqrt{2} \cdot \sqrt{\frac{2mv_{th}d}{eB_Q}} = 2\sqrt{2} \frac{\sqrt[4]{8mkT_{el}}}{\sqrt[2]{\frac{eB_Q}{d}}} \quad \text{(Equation 3)}$$

$D_{1/2}$ corresponds, in good approximation, to the measured diagonal diameter of the radiant zone.

Appendix A2: Ionisation and Excitation

The study will be conducted taking the Ar ion laser as an example and limiting the examination to the plasma within the plasma column (FIG. 2). Ionisation and excitation take place, substantially, through electron collision under the influence of the longitudinal (parallel to the z-axis) and azimuthal electric field components excited by the high-frequency fields. In this respect, Ohm's (generalised) Law of Plasma Physics $\vec{j} = \sigma \vec{E}_{HF}$ applies. In respect of the term $j_z$ (longitudinal component), $$\sigma_{DR} = \frac{n_i e^2}{m} \cdot \tau_{en}$$

holds according to the Drude-Lorentz theory for that part of the total flow, with $\tau_{en}$=collision time for electron/atom collisions (with neutral Ar atoms). The collision time is $$\tau_{en} = \frac{\lambda_{en}}{v_{th}} \text{ with } \lambda_{en} = \frac{1}{n_0 q_{en}},$$

where $\lambda_{en}$ is the free path length for the electron/neutral atom collision and $q_{el}$ is the collision cross-section for that electron collision. One thus obtains, in good approximation, the degree of ionisation and the conductivity:

$$\sigma_{DR} = \frac{n_i}{n_0} \cdot \frac{e^2}{\sqrt{2mkT_{el}}} \cdot \frac{1}{q_{el}} \text{ with } \frac{n_i}{n_0} = \alpha = \text{degree of ionisation}$$

Applying the SAHA formula:

$$\alpha = \frac{n_i}{n_0} = 4.91 \cdot 10^{10} \cdot \frac{T_{el}^{3/4}}{n_0^{1/2}} \cdot e^{\frac{w_i}{2kT_{el}}}$$

wherein $w_i$ is the ionisation energy of Ar ($\approx 16$ eV), $n_0$ is m$^{-3}$ and $q_{el} \approx 10^{-19}$ m$^2$. As the electron temperature rises, the degree of ionisation and the electron/electron and electron/ion interaction become more important. This leads to Spitzer's conductivity formula, which is based on the low-angle dispersion occurring as a result of the long-range Coulomb forces. $T_{en}$ has, therefore, to be replaced by $T_{ee}+T_{ei}$ in the Drude equation, where $$\tau_C \sim \frac{1}{n_i}$$

has to be inserted in $\tau_c = \tau_{ei} + \tau_{ee}$ as collision time for the before-mentioned ">90°-collisions". According to Spitzer, therefore, $\sigma_{Sp} \approx 4 \cdot 10^{-3} \cdot T_{el}^{3/2}$ ($T_{el}$ in Kelvin) holds for "fully ionised plasmas". The condition $\sigma_{DR} = \sigma_{Sp}$ characterises the overlapping area between the two representations of $\delta$ as function of $T_{el}$. It begins for argon at approximately 9000 K. Below that temperature, a very steep temperature dependence of $\sigma_{DR}$ is obtained due to the steep rise of a between 5000 K and 9000 K. Above 5000 K, a relatively slow growth in conductivity with $T_{el}^{3/2}$ is obtained. Above $kT_{el} \approx 10eV$ high degrees of ionisation (detectable through application of the SAHA formula to multiple-ionised gases) and, thus, new perspectives for VUV laser systems, especially with pulsed HF energy supply, are obtained. Below approximately 5000 K, the degree of ionisation and, thus, the conductivity are very low. In this case, the ionisation through the "runaway" electrons, which has not been taken into account in this discussion, becomes significant. Ionisation and, thus, excitation of the laserable levels, is then proportional to $j_{runaway}^2$ wherein $j_{runaway}$ represents the flow density of the flow of rapid runaway electrons. In this low-temperature case, the laser system behaves very similarly as conventional Ar ion lasers, though here again a higher efficiency can be noticed, due to the improved economy of the generation of charge carriers.

Appendix A3: The Compression of the Plasma

The compression of the plasma results from the interaction between the strong degree of focusing in the gradient field and the preferred multiplication of charge carriers in the region $2y<D_{1/2}$; in the case of high currents a rise in density can be observed which is due to the magnetohydrodynamic forces ($n_i T_{el} \sim I_{HF}^2$). The magnet fields of the static quadrupole play an important role for the spatial stabilisation of the plasma column in this connection. This provides an advantage with respect to the optical quality of the emitted laser radiation. The discussion of Appendix A1 illustrates the "confinement" of the electron orbits to the structure of the magnetic field lines of the quadrupole field, the motion space of the electrons and their multiplication being limited to the space of the plasma column. The ions, on the other hand, whose B·ρ values are significantly higher in the central region, are locked in by the ensemble of electrons, through electrostatic forces, so that finally a slightly increased diagonal diameter (equal to approximately twice the Debye length is obtained for the ion ensemble. As a result, a potential drop occurs in the boundary region, with a potential difference between electrons and ions of $$\Delta U = \frac{kT_{el}}{e}.$$

PARTS LIST

1 Magnet pole
2 Magnet pole
3 Windings
4 Coil
5 Current source
6 Container
7 Extraction window
8 Concave mirror
9 Mirror
10 Laser beam
11 Plasma column
12 x-axis
13 y-axis
14 z-axis
15 High-frequency generator
16 Electrodes
17 Electrodes
18 Capacitor
19 Coil
20 Coil
21 Re-charging capacitor
22 Switch
23 Re-charger 24 Electrodes
25 Electrodes
26 Region
27 Arrows
28 Blower
29 Heat-exchanger
30 Discharge line
31 Shut-off valve
32 Supply line
33 Shut-off valve
34 Plasma distance Zeichnungstexte:
FIG. 1
To HF generator
FIG. 2
Scanned image of the laseractive plasma
Diagonal diameter 2.8 mm
Pole shoe distance 3 cm
Neon, 40 MHz, 40 W
FIG. 3

| z-Achse | z-axis |
|---|---|
| existiert nicht | does not exist |
| Elektronen... | Electron orbits according to Appendix A1 |

FIG. 4
To HF generator 15
FIG. 5

| HF Generator | HF generator |
|---|---|
| Ladegerät | Re-charger |

What is claimed is:

1. A gas laser comprising a container containing a gas or a gas mixture as laser-active medium, the container having an axis along which the gas laser emits its laser radiation, and comprising further means for generating a plasma in the container and means for generating a magnetic field in the container, wherein at least one group of two pairs of magnet poles is provided, with the poles extending at a distance from, and along the axis and being arranged around the axis with circumferentially alternating polarity so that a quadrupole field is obtained which exhibits an intensity sink along the axis, and the means for generating the plasma include a source for an electromagnetic alternating field which source is associated with the container.

2. The gas laser as defined in claim 1, wherein the magnetic field disappears in the region of the axis.

3. The gas laser as defined in claim 1 wherein the axis is an axis of symmetry of the arrangement of magnet poles.

4. The gas laser as defined in claim 1, wherein the axis is an axis of symmetry of the container.

5. The gas laser as defined in claim 1, wherein the container comprises a tube.

6. The gas laser as defined in claim 1, wherein no more than four magnet pole pairs are arranged around the axis in any cross-sectional plane of the container.

7. The gas laser as defined in claim 1, wherein a plurality of groups of two pairs of magnet poles are located one behind the other in the direction of the axis.

8. The gas laser as defined in claim 1, wherein said poles generate a magnetic field with a strength of up to 10 Tesla.

9. The gas laser as defined in claim 1, wherein said poles generate a magnetic field with a strength of between 0.1 and 1 Tesla.

10. The gas laser as defined in claim 1, wherein said magnet poles are formed on magnets located outside the container.

11. The gas laser as defined in claim 1, wherein said poles are formed on permanent magnets.

12. The gas laser as defined in claim 11, wherein said poles are formed by at least one electromagnets.

13. The gas laser as defined in claim 11 characterised in that the one or more electromagnets are excited by an alternating-current source (5), especially with alternating current of 50 Hz or 60 Hz.

14. The gas laser as defined in claim 13, wherein said at least one electromagnet is excited by an alternating-current source.

15. The gas laser as defined in claim 14, further comprising an electromagnetic alternating field that generates plasma, wherein the frequency of the alternating-current source is low compared with the frequency of the electromagnetic alternating field.

16. The gas laser as defined in claim 1, wherein the pressure of the gas or the gas mixture in the container is such that for the elastic collision of thermal electrons with neutral atoms or molecules of the gas the thermal electrons have a mean free path length which is approximately equal to the mean value of $2\pi$ times the gyration radius of the free electrons in the magnetic field at the periphery of the plasma.

17. The gas laser as defined in claim 1, wherein the source of the electromagnetic alternating field is a coil which surrounds the container and which is part of an electric oscillating circuit, said oscillating circuit is fed by a frequency generator.

18. The gas laser as defined in claim 17, wherein the coil surrounds the container only over a portion of its length spaced from the ends of the container.

19. The gas laser as defined in claim 18, wherein the windings of the coil enclose the area of the axis of the multipole field emanating from the poles.

20. The gas laser as defined in claim 19, wherein at least two electrodes in the container are the source of the electromagnetic alternating field and part of an electric oscillating circuit which is fed by a frequency generator.

21. The gas laser as defined in claim 20, wherein each of the electrodes has a passage for the laser radiation in the region of the axis of the multipole field emanating from the poles.

22. The gas laser as defined in claim 21 wherein the oscillating circuit comprises a coil, which is connected in series with, and surrounds, the plasma line which during the operation of the gas laser is generated between and defined by the electrodes, and wherein the oscillating circuit comprises a capacitor which is connected in parallel to the arrangement formed by the coil and the plasma line between the electrodes.

23. The gas laser as defined in claim 22, characterised in that the electromagnetic alternating field has a frequency of at least 50 Hz.

24. The gas laser as defined in claim 1, characterised in that the electromagnetic field is a high-frequency field.

25. The gas laser as defined in claim 1, characterised in that the electromagnetic field is a microwave field.

26. The gas laser as defined in claim 1, characterised in that the source of the electromagnetic alternating field is a frequency-adjusted and, thus, resonant cavity that encloses the spatial region of the laser-active plasma and is part of a high-frequency generator or a microwave generator.

27. The gas laser as defined in claim 1, wherein the source of the electromagnetic alternating field is a HF-resonant cavity that surrounds a spatial region including the laser-active plasma and which is part of a high-frequency generator.

28. The gas laser as defined in claim 1, characterised in that it is a laser operated in the pulsed mode.

29. The gas laser as defined in claim 1, wherein said gas laser is a laser operated in a pulsed mode.

30. The gas laser as defined in claim 29, wherein the means for generating said plasma are so selected as to permanently generate a gas discharge and to super-impose the permanent gas discharge by a pulsed energy supply to the plasma.

31. The gas laser as defined in claim 29, wherein electrodes limiting the length of the plasma column in the container are provided, which electrodes are part of a circuit in which a re-chargeable capacitor is discharged via a quick-acting electronic switch and via the electrodes.

32. The gas laser as defined in claim 29, wherein a coil is provided that surrounds the container substantially where the plasma is generated, the coil being part of a circuit in which a re-chargeable capacitor is discharged via a quick-acting electronic switch and via the coil.

33. The gas laser as defined in claim 31, wherein said quick-acting switch is selected from the group of a thyratron, a thermistor or a pseudo spark switch.

34. The gas laser as defined in claim 1, wherein the gas or the gas mixture in the container contains at least one rare gas from the group including helium, neon, argon, xenon and krypton.

35. The gas laser as defined in claim 34, the means for generating the plasma and the means for generating a magnetic field are configured such that laser transitions are excited in single-charged or multiple-charged ions of the rare-gas filling and that the laser radiation resulting therefrom is emitted through an extraction window.

36. The gas laser as defined in claim 1, wherein the container contains substantially carbon dioxide.

37. The gas laser as defined in claim 36, wherein the container contains additionally an amount of nitrogen and helium.

38. The gas laser as defined in claim 1, wherein for doubling or multiplying the frequency of the emitted laser radiation non-linear optic crystal means are provided generate harmonic waves of the radiation entering the non-linear optic crystal.

39. The gas laser according to claim 1 for use in medical operations, especially for operations on eyes and for skin treatments.

40. The gas laser as defined in claim 14, wherein the alternate current source operates at a frequency of between approximately 50 and 60 Hertz.

41. The gas laser as defined in claim 18, wherein the windings of the coil enclose the area of the axis of a four-pole field emanating from two magnetic pole pairs.

42. The gas laser as defined in claim 20, wherein each of the electrodes has a passage for the laser radiation in the region of the axis of the quadrupole field emanating from two magnetic pole pairs.

43. The gas laser as defined in claim 20 wherein the oscillating circuit comprises a coil which is connected in series with and surrounds the plasma line which during operation of the gas laser is generated between and defined by the electrodes and wherein the oscillating circuit comprises a capacitor which is connected in parallel to the arrangement formed by the coil and the plasma line between the electrodes.

44. The gas laser as defined in claim 1, wherein the source of the electromagnetic alternating field is a microwave resonant cavity that surrounds a spatial region including the laser-active plasma and which is part of a microwave generator.

45. The gas laser as defined in claim 30, wherein said permanent gas discharge comprises an HF gas discharge.

46. A gas laser as defined in claim 30, wherein said permanent gas discharge comprises a microwave gas discharge.

47. The gas laser as defined in claim 30, wherein electrodes limiting the length of a plasma column in the container are part of a circuit in which a re-chargeable capacitor is discharged via a quick-acting electronic switch and via the electrodes.

48. The gas laser as defined in claim 30, wherein a coil is provided that substantially encloses the plasma, the coil being part of a circuit in which a re-chargeable capacitor is discharged via a quick-acting electronic switch and via the coil.

49. The gas laser as defined in claim 31, wherein said quick-acting switch is selected from the group of a thyratron, a thermistor or a pseudo spark switch.

50. The gas laser as defined in claim 35, wherein the container contains additionally an amount of nitrogen and neon.

* * * * *